(12) United States Patent
Shao et al.

(10) Patent No.: US 12,510,874 B2
(45) Date of Patent: Dec. 30, 2025

(54) METHODS AND INTERNET OF THINGS (IoT) SYSTEMS FOR MONITORING RELIABILITY OF SMART GAS PIPELINE NETWORK

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 434 days.

(21) Appl. No.: 18/068,492

(22) Filed: Dec. 19, 2022

(65) Prior Publication Data
US 2023/0213912 A1 Jul. 6, 2023

(30) Foreign Application Priority Data
Dec. 7, 2022 (CN) .......................... 202211560582.X

(51) Int. Cl.
*G05B 19/406* (2006.01)
(52) U.S. Cl.
CPC .. *G05B 19/406* (2013.01); *G05B 2219/41108* (2013.01)
(58) Field of Classification Search
None
See application file for complete search history.

(56) References Cited

U.S. PATENT DOCUMENTS

2019/0271441 A1* 9/2019 Zhang .................... F17D 5/06
2021/0215569 A1   7/2021 Enev et al.

FOREIGN PATENT DOCUMENTS

CN      105404776 A    3/2016
CN      107782362 A    3/2018
(Continued)

OTHER PUBLICATIONS

First Office Action in Chinese Application No. 202211560582.X mailed on Feb. 22, 2025, 23 pages.
(Continued)

*Primary Examiner* — Mohammad Ali
*Assistant Examiner* — Saad M Kabir
(74) *Attorney, Agent, or Firm* — METIS IP LLC

(57) ABSTRACT

Methods for monitoring reliability of a smart gas pipeline network are provided. The method may be implemented based on a smart gas safety management platform of an Internet of Things (IoT) system for monitoring reliability of a smart gas pipeline network. The method may include: obtaining a reliability sequence of the gas pipeline network, the reliability sequence including reliability of the gas pipeline network at a plurality of moments; and determining a monitoring plan based on the reliability sequence, wherein determining the reliability of the gas pipeline network at each of the plurality of moments includes: obtaining a gas transportation feature of the gas pipeline network at a target moment; determining, based on the gas transportation feature, a degree of wear of a pipeline wall; and determining, based on the degree of wear of the pipeline wall, the reliability of the gas pipeline network at the target moment.

20 Claims, 6 Drawing Sheets

(56) References Cited

FOREIGN PATENT DOCUMENTS

| | | |
|---|---|---|
| CN | 108700486 A | 10/2018 |
| CN | 111192163 A | 5/2020 |
| CN | 111536421 A | 8/2020 |
| CN | 112856249 A | 5/2021 |
| CN | 114881269 A | 8/2022 |
| CN | 115076618 A | 9/2022 |
| JP | 2004138627 A | 5/2004 |

OTHER PUBLICATIONS

Sun, Xiao et al., Research on the Construction of Intelligent Gas Management Platform, China Public Security (Academy Edition), 2: 23-25, 2018.

* cited by examiner

METHODS AND INTERNET OF THINGS (IoT) SYSTEMS FOR MONITORING RELIABILITY OF SMART GAS PIPELINE NETWORK

CROSS-REFERENCE TO RELATED APPLICATIONS

This application claims priority of Chinese Patent Application No. 202211560582.X, filed on Dec. 7, 2022, the entire contents of which are hereby incorporated by reference.

TECHNICAL FIELD

The present disclosure relates to the field of gas safety, and in particular, to methods and Internet of Things (IoT) systems for monitoring reliability of a smart gas pipeline network.

BACKGROUND

As a transmission and distribution system of gas in a city, a gas pipeline network in the city has become one of important symbols of urban modernization. With needs of an urban development, the gas pipeline network continues to extend, and safety problems of the gas pipeline network operation are becoming more and more prominent, especially the problem of pipeline network damage. Due to long-term wear and tear of a pipeline wall, problems such as corrosion and leakage are prone to occur, which constitutes a hidden danger of accidents. The gas pipeline network is generally laid underground, coupled with a complex urban environment, which has invisibly increased difficulty of risk investigation of the gas pipeline network. Once an accident occurs, it may bring huge personal and property losses.

Therefore, it is necessary to provide a method for monitoring reliability of a smart gas pipeline network to ensure reliable operation of the gas pipeline network.

SUMMARY

One or more embodiments of the present disclosure provide a method for monitoring reliability of a smart gas pipeline network. The method may be implemented based on a smart gas safety management platform of an Internet of Things (IoT) system for monitoring reliability of a smart gas pipeline network. The method may include: obtaining a reliability sequence of the gas pipeline network, the reliability sequence including reliability of the gas pipeline network at a plurality of moments; and determining a monitoring plan based on the reliability sequence, wherein determining the reliability of the gas pipeline network at each of the plurality of moments includes: obtaining a gas transportation feature of the gas pipeline network at a target moment; determining, based on the gas transportation feature, a degree of wear of a pipeline wall; and determining, based on the degree of wear of the pipeline wall, the reliability of the gas pipeline network at the target moment.

One or more embodiments of the present disclosure provide an Internet of Things (IoT) system for monitoring reliability of a gas pipeline network. The IoT system may include: a smart gas user platform, a smart gas service platform, a smart gas safety management platform, a smart gas pipeline network device sensor network platform, a smart gas pipeline network device object platform. The smart gas pipeline network device object platform may be configured to obtain a gas transportation feature of the gas pipeline network at a target moment; and transmit the gas transportation feature to the smart gas safety management platform through the smart gas pipeline network device sensor network platform. The smart gas service platform may be configured to send a monitoring plan received from the smart gas safety management platform to the smart gas user platform. The smart gas safety management platform may be configured to: obtain a reliability sequence of the gas pipeline network, the reliability sequence including reliability of the gas pipeline network at a plurality of moments; and determine the monitoring plan based on the reliability sequence. Determining the reliability of the gas pipeline network at each of the plurality of moments may include: obtaining a gas transportation feature of the gas pipeline network at a target moment; determining, based on the gas transportation feature, a degree of wear of a pipeline wall; and determining, based on the degree of wear of the pipeline wall, the reliability of the gas pipeline network at the target moment.

One or more embodiments of the present disclosure provide a non-transitory computer-readable storage medium storing computer instructions. When reading the computer instructions in the storage medium, a computer may implement the method for monitoring reliability of a smart gas pipeline network.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
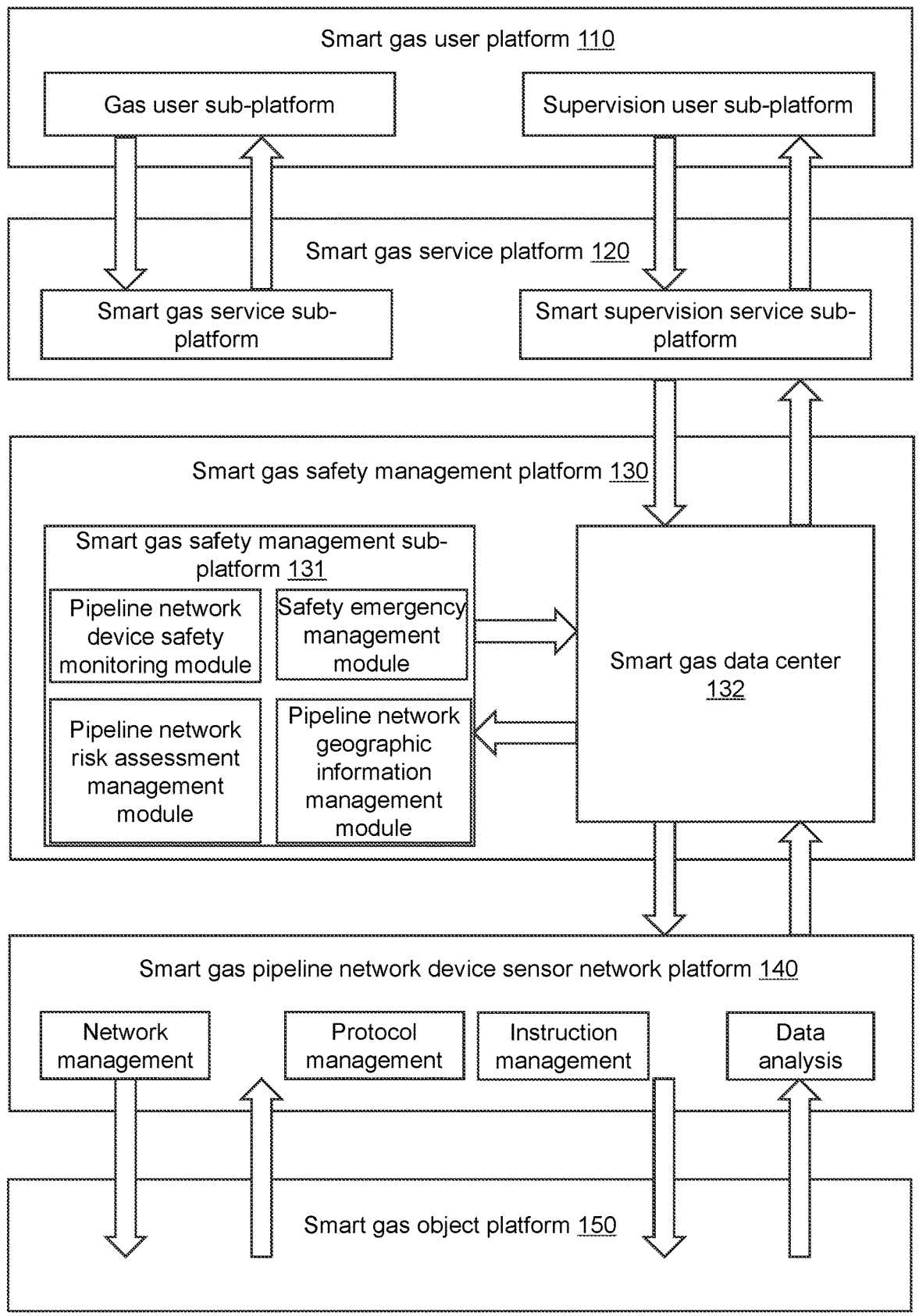
FIG. 1 is a schematic diagram illustrating an Internet of Things (IoT) system for monitoring reliability of a gas pipeline network according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an Internet of Things (IoT) system for monitoring reliability of a gas pipeline network according to some embodiments of the present disclosure.

The IoT system may be an information processing system including some or all of a user platform, a service platform, a management platform, a sensor network platform, and an object platform. The user platform may be a functional platform that obtains user's perceptual information and generates control information. The service platform may realize connection between the management platform and the user platform, and play functions of perceptual information service communication and control information service communication. The management platform may be configured to overall plan and coordinate connection and cooperation among various functional platforms (such as the user platform and the service platform). The management platform may gather all information of an IoT operation system, and provide functions of perception management and control management for the IoT operation system. The sensor network platform may realize connection between the management platform and the object platform, and play functions of perceptual information sensor communication and control information sensor communication. The object platform may be a functional platform for generating perceptual information.

In some embodiments, the IoT system 100 for monitoring reliability of a smart gas pipeline network may include a smart gas user platform 110, a smart gas service platform 120, a smart gas safety management platform 130, a smart gas pipeline network device sensor network platform 140, and a smart gas pipeline network device object platform 150.

The smart gas user platform 110 may be a platform for interacting with a user. The user may be a gas user, a manager, a maintenance personnel, etc. For example, the gas user may be an ordinary gas user, a commercial gas user, an industrial gas user, etc. The manager may be a supervision user, etc. In some embodiments, the smart gas user platform 110 may be configured as a terminal device. For example, the terminal device may include a mobile device, a tablet computer, or the like, or any combination thereof. In some embodiments, the smart gas user platform 110 may be configured to receive a request and/or an instruction input by the user. For example, the smart gas user platform 110 may obtain an instruction for querying safety information of a gas pipeline network device through the terminal device. In some embodiments, the smart gas user platform 110 may feedback the information to the user through the terminal device. For example, the smart gas user platform 110 may display warning information (for example, the reliability of the gas pipeline network is lower than a threshold) to the user through the terminal device (e.g., a display). In some embodiments, the smart gas user platform 110 may send the request and/or the instruction input by the user to the smart gas service platform 120, and obtain corresponding information fed back by the smart gas service platform 120.

In some embodiments, the smart gas user platform 110 may include a gas user sub-platform and a supervision user sub-platform. The gas user sub-platform may correspond to a smart gas use service sub-platform. For example, the gas user sub-platform may obtain information such as gas consumption, gas fee, etc. of the gas user from the smart gas use service sub-platform, and feedback the information to the user. As another example, the gas user sub-platform may send reminder information, alarm information, etc. of gas use to the gas user through the terminal device. The supervision user sub-platform may correspond to a smart supervision service sub-platform. In some embodiments, the supervision user may supervise and manage safe operation of the entire IoT system through the supervision user sub-platform to ensure safe and orderly operation of the IoT system 100 for monitoring reliability of a smart gas pipeline network.

The smart gas service platform 120 may be a platform for conveying user's needs and control information. The smart gas service platform 120 may be connected to the smart gas user platform 110 and the smart gas safety management platform 130. The smart gas service platform 120 may obtain data from the smart gas safety management platform 130 (for example, a smart gas data center) and send the data to the smart gas user platform 110. In some embodiments, the smart gas service platform 120 may include a processing device and other components. The processing device may be a server or a server group.

In some embodiments, the smart gas service platform 120 may include the smart gas use service sub-platform and the smart supervision service sub-platform. The smart gas use service sub-platform may be a platform that provides a gas service for the gas user, which may correspond to the gas user sub-platform. For example, the smart gas use service sub-platform may send information such as a gas bill of the gas user, a gas use safety guideline, and a gas use abnormality reminder to the gas user sub-platform, and then feedback to the gas user. The smart supervision service sub-platform may be a platform that provides a supervision need for the supervision user, which may correspond to the supervision user sub-platform. For example, the smart supervision service sub-platform may send safety management information of the gas device and dispatching information of a maintenance engineering to the supervision user sub-platform, and the supervision user may conduct a review, a supervision and a guidance.

The smart gas safety management platform 130 may refer to a platform configured to over plan and coordinate connection and cooperation among various functional platforms, to gather all the information of the IoT, and to provide the functions of perception management and control management for the IoT operation system. In some embodiments, the smart gas safety management platform 130 may include a processing device and other components. The processing device may be a server or a server group. In some embodiments, the smart gas safety management platform 130 may be a remote platform controlled by a manager, artificial intelligence, or a preset safety rule.

In some embodiments, the smart gas safety management platform 130 may include a smart gas pipeline network safety management sub-platform 131 and a smart gas data center 132

The smart gas pipeline network safety management sub-platform 131 may be a platform for analyzing and processing data. In some embodiments, the smart gas pipeline network safety management sub-platform 131 may perform a bidirectional interaction with the smart gas data center 132. For example, the smart gas pipeline network safety management sub-platform 131 may obtain data related to safety management (for example, pipeline network safety management data) from the smart gas data center 132 for analysis and processing, and send a processing result to the smart gas data center 132.

In some embodiments, the smart gas pipeline network safety management sub-platform 131 may include a pipeline network device safety monitoring module, a safety emergency management module, a pipeline network risk assessment management module, and a pipeline network geographic information management module. The pipeline network device safety monitoring module may be configured to process historical safety data, current safety data, etc. of operation of a device in the smart gas object platform 150. The safety emergency management module may form an emergency response plan according to a safety risk of the pipeline network device. The pipeline network risk assessment management module may combine pipeline network basic data and operation data to form a pipeline network security risk assessment based on a preset model, perform a safety risk classification according to an assessment result, and combine a geographic information system (GIS) to perform three-dimensional (3D) visualization management with different color differentiation. The pipeline network geographic information management module may view geographic information and attribute information of the pipeline and the device in real time, and provide data support for on-site operation.

In some embodiments, the smart gas data center 132 may automatically send the obtained safety data to the corresponding pipeline network device monitoring module by recognizing a safety parameter category (such as a gas consumption and a usage duration). The safety monitoring module may have a preset safety monitoring threshold, automatically alarm in the management platform after the threshold is exceeded, and optionally push alarm information to the user (such as the supervision user) automatically. In some embodiments, the smart gas pipeline network safety management sub-platform 131 may further include a pipeline network inspection safety management module, a station inspection safety management module, a pipeline network gas leakage monitoring module, a station gas leakage monitoring module, a station device safety monitoring module, and a pipeline network simulation management module, etc. It should be noted that the above management modules are not intended to limit the management modules included in the smart gas pipeline network safety management sub-platform 131.

The smart gas data center 132 may be configured to store and manage all operation information of the IoT system 100 for monitoring reliability of a smart gas pipeline network. In some embodiments, the smart gas data center 132 may be configured as a storage device (for example, a database) for storing historical and current gas safety data. For example, the smart gas data center 132 may store safety information of the gas pipeline network, an arrangement records of maintenance personnel, abnormal information of the gas pipeline network, etc.

In some embodiments, the smart gas safety management platform 130 may exchange information with the smart gas service platform 120 and the smart gas pipeline network device sensor network platform 140 respectively through the smart gas data center 132. For example, the smart gas data center 132 may receive an instruction for querying the abnormal information of the gas pipeline network of the maintenance personnel issued by the smart gas service platform 120 (for example, the smart supervision service sub-platform), and send a query result to the smart gas service platform 120. As another example, the smart gas data center may send an instruction for obtaining gas-related data (for example, gas transportation data) of the gas pipeline network to the smart gas pipeline network device sensor network platform 140, and receive the gas transportation data uploaded by the smart gas pipeline network device sensor network platform.

The smart gas pipeline network device sensor network platform 140 may be a functional platform for managing sensor communication. In some embodiments, the smart gas pipeline network device sensor network platform 140 may be connected to the smart gas safety management platform 130 and the smart gas object platform 150 to realize the functions of perceptual information sensor communication and control information sensor communication.

In some embodiments, the smart gas pipeline network device sensor network platform 140 may be configured to achieve functions such as network management, protocol management, instruction management, data analysis, etc.

The smart gas object platform 150 may be a functional platform for generating the perceptual information. For example, the smart gas object platform 150 may generate safe operation information of the gas pipeline network (for example, the abnormal information of the gas pipeline network), and upload the information to the smart gas data center 132 through the smart gas pipeline network device sensor network platform 140.

In some embodiments, the smart gas object platform 150 may be configured as various types of gas devices (e.g., gas pipeline network devices) and monitoring devices, which may be configured to obtain the operation information of the gas device. For example, the smart gas device object platform 150 may obtain a gas transportation feature such as gas flow, pressure, and temperature of the gas pipeline network device in real time through a gas flow meter, a pressure sensor, a temperature sensor, etc., and send the gas transportation feature through the smart gas pipeline network device sensor network platform 140 to the smart gas data center 132.

In some embodiments of the present disclosure, based on the IoT system 100 for monitoring reliability of a gas pipeline network, a closed loop of the smart gas safety management information operation among the pipeline network device, a gas operator, the gas user, and the supervision user may be formed, which can realize informatization and wisdom of the pipeline network safety management information, thereby ensuring effective management of gas safety.

It should be noted that the IoT system 100 for monitoring reliability of a gas pipeline network is provided for the purpose of illustration only, and is not intended to limit the scope of the present disclosure. For those skilled in the art, various modifications or changes can be made according to the description in the present disclosure. For example, the IoT system 100 for monitoring reliability of a gas pipeline network may include one or more other suitable components to achieve similar or different functions. However, changes and modifications do not depart from the scope of the present disclosure.

Figure 2:
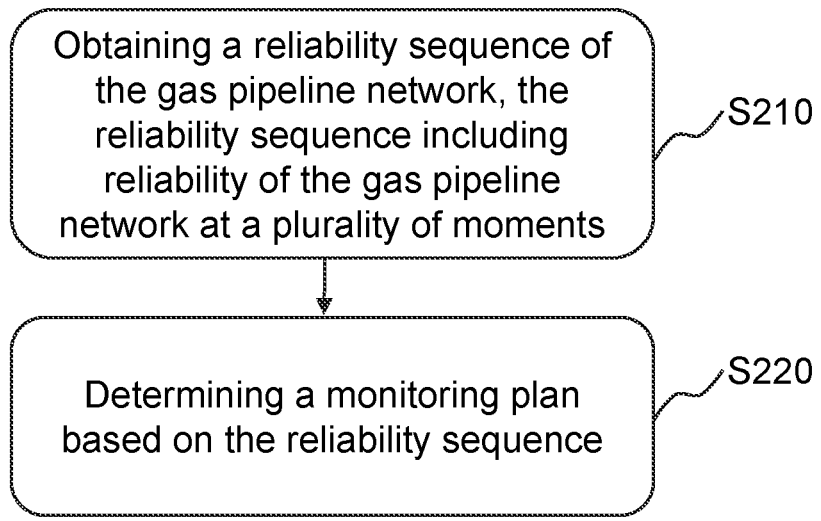
FIG. 2 is a flowchart illustrating an exemplary process of a method for monitoring reliability of a smart gas pipeline network according to some embodiments of the present disclosure.

FIG. 2 is a flowchart illustrating an exemplary process of a method for monitoring reliability of a smart gas pipeline network according to some embodiments of the present disclosure. As shown in FIG. 2, the process 200 may include the following operations. In some embodiments, the process 200 may be executed by the smart gas safety management platform 130.

In S210, obtaining a reliability sequence of the gas pipeline network, the reliability sequence including reliability of the gas pipeline network at a plurality of moments.

The reliability may be used to indicate a probability that the gas pipeline network maintains safe operation. The reliability may be expressed as a value or a percentage. For example, a reliability of 1 or 100% may indicate that the gas pipeline network has a highest probability of maintaining the safe operation, and a reliability of 0.6 or 60% may indicate that the gas pipeline network has a relatively low probability of maintaining the safe operation. As a running time of the gas pipeline network increases, the reliability of the gas pipeline network may decrease.

In some embodiments, the reliability of the gas pipeline network may be determined according to a historical maintenance condition of the gas pipeline network or a remaining service time of the pipeline. For example, the reliability of the gas pipeline network may decrease by 0.1 for each increase in a count of gas pipeline network leakages in a historical maintenance record table. For every 10% decrease in the remaining service time of the pipeline, the reliability of the gas pipeline network may decrease by 0.1. A value by which the reliability may decrease may be artificially set according to historical use experience of the gas pipeline network.

In some embodiments, the reliability of the gas pipeline network may also be determined according to the gas transportation feature. Further description regarding the gas transportation feature and determining the reliability of the gas pipeline network based on the gas transportation feature may be found in FIG. 3.

The reliability sequence may be a sequence composed of the reliability at the plurality of moments. In some embodiments, the reliability sequence may be presented in a form of a vector, and each vector element may be a reliability corresponding to a fixed moment. For example, the reliability sequence may be expressed as (0.8, 0.78, 0.75, 0.73), which may mean that the reliability of the gas pipeline network is 0.8 at moment A, 0.78 at moment B, 0.75 at moment C, and 0.73 at moment D. The reliability in the reliability sequence may be arranged in a chronological order, that is, moment A is before moment B, moment B is before moment C, and moment C is before moment D. Intervals between different moments may be set artificially, and the intervals may be the same or different. For example, time intervals for the maintenance personnel to regularly perform inspection, examination, and maintenance may be taken as the intervals between moments corresponding to different reliability.

Figure 3:
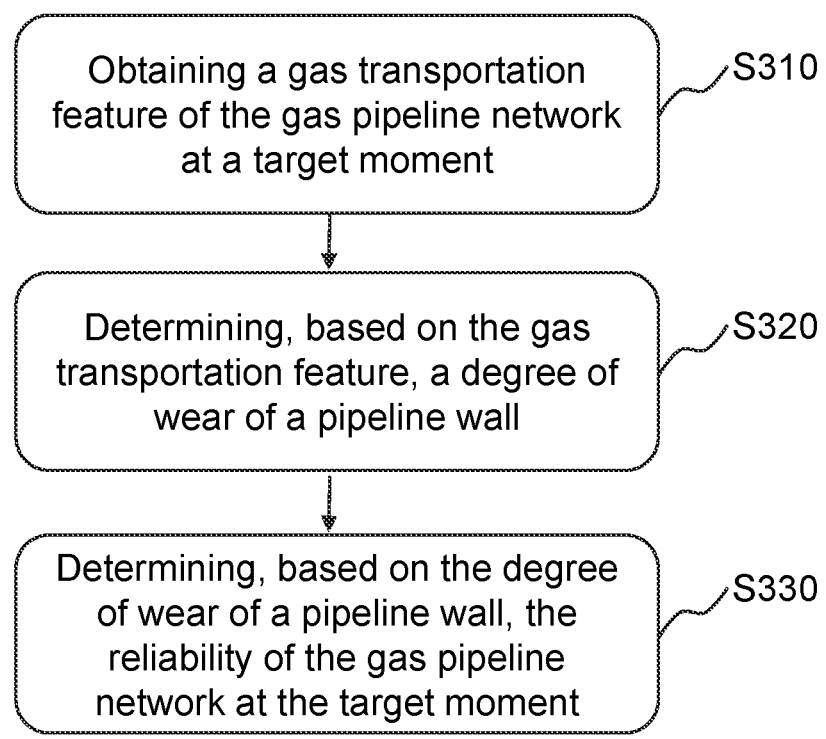
FIG. 3 is a flowchart illustrating an exemplary process for determining reliability of a gas pipeline network at a target moment according to some embodiments of the present disclosure.

FIG. 3 is a flowchart illustrating an exemplary process for determining reliability of a gas pipeline network at a target moment according to some embodiments of the present disclosure. As shown in FIG. 3, the process 300 may include the following operations.

In S310, obtaining a gas transportation feature of the gas pipeline network at a target moment.

The target moment may be any moment during operation of the gas pipeline network. For example, the target moment may be 16:00 every afternoon. The target time may be set artificially, for example, a moment when a gas use peak is located may be set as the target time.

The gas transportation feature may refer to information related to gas transportation during a gas transportation process. For example, the gas transportation feature may include gas composition information, transportation pressure information of the gas pipeline network, gas transmission flow rate information, gas transmission temperature information, etc.

In some embodiments, the gas transportation feature such as the gas transmission flow rate information of the gas pipeline network device, the transportation pressure information of the gas pipeline network, the gas transmission temperature information, etc. may be obtained in real time through a gas flow meter, a pressure sensor, a temperature sensor, etc. in the smart gas device object platform 150. The gas composition information may refer to composition contained in the gas, for example, the gas composition may include methane, ethane, propane, hydrogen sulfide, carbon dioxide, water vapor, solid particles, etc. The gas composition information may be detected by means of sampling at a sampling port.

In S320, determining, based on the gas transportation feature, a degree of wear of a pipeline wall.

The degree of wear of the pipeline wall may refer to a degree of wear of the pipeline of the gas pipeline network, which may be used to reflect a wear condition of the pipeline of the gas pipeline network. A value between 0 and 1 may be used to reflect the degree of wear of the pipeline wall. The larger the value is, the greater the degree of wear of the pipeline wall may be, and the more serious the wear condition of the pipeline of the gas pipeline network may be. The degree of wear of the pipeline wall may be obtained in various ways. For example, the degree of wear of the pipeline wall may be determined by human experience, or a specific value of the degree of wear of the pipeline wall may be determined through a table of a degree of wear of the pipeline wall pipeline wall. The table of a degree of wear of a pipeline wall may include a historical gas transportation feature and a value of a degree of wear of a pipeline wall corresponding to the historical gas transportation feature. For example, if the gas transportation feature is 2.5 MPa<transmission pressure≤4.0 MPa, and high pressure transmission for 1 year, the value of the degree of wear of the pipeline wall corresponding to the gas transportation feature may be 0.1; if the gas transportation feature is 2.5 MPa<transmission pressure≤4.0 MPa, and high pressure transmission for 2 years, and the value of the degree of wear of the pipeline wall corresponding to the gas transportation feature may be 0.15.

In some embodiments, the degree of wear of the pipeline wall may be determined through a degree of wear determination model based on the gas transportation feature. In some embodiments, the degree of wear determination model may be a machine learning model. Further description regarding the degree of wear determination model may be found in FIG. 4.

In S330, determining, based on the degree of wear of the pipeline wall, the reliability of the gas pipeline network at the target moment.

In some embodiments, the reliability of the gas pipeline network at the target moment may be determined according to a reliability preset rule. For example, the reliability preset rule may determine the reliability of the gas pipeline network at the target moment according to a frequency of a gas leakage or a safety accident corresponding to different historical degrees of wear of pipeline wall. Exemplarily, if the degree of wear of the pipeline wall of the gas pipeline network at the target moment is 0.5, and the frequency of the gas leakage when the historical degree of wear of pipeline wall is 0.5 is 0.7, it may be determined that the reliability of the gas pipeline network at the target moment is 1−0.7=0.3.

In S220, determining a monitoring plan based on the reliability sequence.

The monitoring plan may refer to monitoring measures taken on a gas pipeline network parameter to ensure safe operation of the gas pipeline network. For example, the monitoring plan may include frequencies of pipeline internal cleaning and gas leakage detection, a frequency of lubrication of a rotating part of a gas pipeline installation device, precision and accuracy of a monitoring device, etc.

In some embodiments, after the reliability sequence of the gas pipeline network is obtained, the monitoring plan may be determined according to a trend of the reliability in the reliability sequence changing over time. For example, if a sequence composed of reliability of a certain point of the gas pipeline network corresponding to moment A, moment B, moment C, moment D, and moment E at a same interval is (0.95, 0.94, 0.93, 0.92, 0.8), and the reliability of the gas pipeline network from moment D to moment E has a significant downward trend, the inspection frequency of the point may be strengthened to determine whether maintenance is required.

In some embodiments, smoothness of the reliability may be determined based on the reliability sequence; and the monitoring plan may be determined based on the smoothness of the reliability.

The smoothness may reflect a size of a variation range of the reliability in a unit time. The greater the variation range of the reliability in the unit time is, the greater the smoothness may be.

In some embodiments, the smoothness of the reliability may be determined by comparing variances of reliability corresponding to a plurality of moments in a plurality of reliability sequences. The larger the variance gap between the reliability sequences is, the worse the smoothness of the reliability may be. In some embodiments, reliability data in the reliability sequence may further be fitted. The greater the curve slope change is, the worse the smoothness of the reliability may be.

In some embodiments, a smoothness threshold of the reliability may be set. When the smoothness is smaller than the smoothness threshold, the smart gas safety management platform 130 may automatically alarm, and automatically push warning information to the gas user through the gas user sub-platform.

Figure 6:
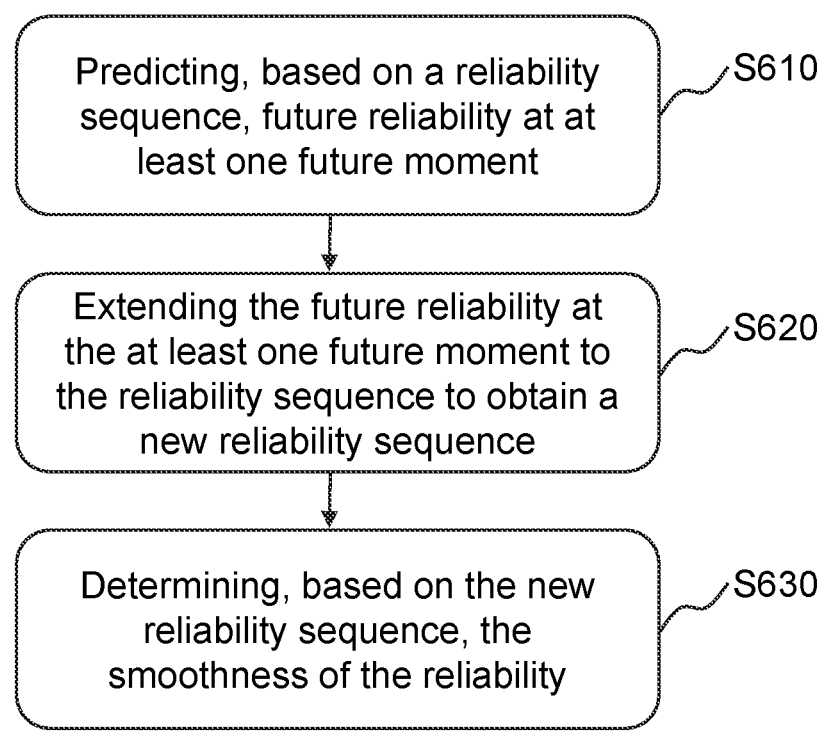
FIG. 6 is a flowchart illustrating an exemplary process for determining smoothness of reliability according to some embodiments of the present disclosure.

FIG. 6 is a flowchart illustrating an exemplary process for determining smoothness of the reliability according to some embodiments of the present disclosure. As shown in FIG. 6, the process 600 may include the following operations. In some embodiments, the process 600 may be executed based on the smart gas safety management platform 130.

In S610, predicting, based on a reliability sequence, future reliability at at least one future moment.

The future reliability may refer to reliability whose corresponding time is after the time corresponding to the current reliability sequence. For example, if moments corresponding to the reliability in a reliability sequence 1 (0.9, 0.89, 0.88) are Feb. 26, 2022, Mar. 26, 2022, and Apr. 26, 2022, respectively, the future reliability may be reliability corresponding to a moment after Apr. 26, 2022. The future reliability may be predicted in various ways. For example, the future reliability may be predicted by curve fitting based on the reliability in the current reliability sequence. In some embodiments, the future reliability may be predicted by a time sequence model. In some embodiments, the time sequence model may be a machine learning model. The time sequence model may process the reliability in the current reliability sequence and output the future reliability.

In S620, extending the future reliability at the at least one future moment to the reliability sequence to obtain a new reliability sequence.

Exemplarily, a reliability sequence obtained based on reliability collected at three moments of Apr. 1, 2022, May 1, 2022, and Jun. 1, 2022 may be a reliability sequence 2, which may be expressed as (0.9, 0.85, 0.8). The reliability sequence 2 may be taken as an input of the model. Reliabilities at future moments of Jul. 1, 2022 and Aug. 1, 2022 may be predicted to be 0.72 and 0.7 based on the time sequence model, respectively. The 0.72 and 0.7 may be extended to the reliability sequence 2 to obtain a new reliability sequence 2' (0.9, 0.85, 0.8, 0.72, 0.7). A count of the reliabilities extended into the new sequence is not limited and may be set according to an actual situation.

In S630, determining, based on the new reliability sequence, the smoothness of the reliability.

In some embodiments, the smoothness of the reliability may be determined based on a preset rule of the smoothness and a slope change rate of a reliability curve corresponding to the new reliability sequence. The extended new reliability sequence in the operation of S620 is taken as an example for illustration. For the obtained new reliability sequence 2' (0.9, 0.85, 0.8, 0.72, 0.7), the curve slope corresponding to the reliability sequence before expansion may be (0.9−0.8)÷2=0.05, in the new reliability sequence, the slope of a line connecting the reliability 0.8 and 0.72 may be (0.8−0.72)÷1=0.08, and the slope change rate may be (0.08−0.05)÷0.05×100%=60%.

In some embodiments, the preset rule of the smoothness may be that in response to a determination that the slope change rate is greater than a preset smoothness threshold, it is determined that the smoothness is abnormal. The preset smoothness threshold may be set manually, for example, the preset smoothness threshold may be set to 50%. In some embodiments, the smoothness may be classified into different levels according to a range of the slope change rate of the reliability curve. For example, when the slope change rate is between 0-30%, the smoothness may be classified to be level 1, indicating that the smoothness of the reliability is relatively good. When the slope change rate is between 30-60%, the smoothness may be classified to be level 2, indicating that the smoothness of the reliability may be abnormal. When the slope change rate is above 60%, the smoothness may be classified to be level 3, indicating that the smoothness of reliability is relatively poor. For example, the slope change rate corresponding to the reliability curve of the new reliability sequence 2' is 60%, indicating that the smoothness of the reliability may be abnormal.

In some embodiments, warning information may further be sent to the gas user in various ways according to the level of smoothness. For example, when the smoothness is level 1, the warning information may be automatically pushed to the gas user through a gas user sub-platform; when the smoothness is above level 2, the warning information may be conveyed to the gas user through a way such as an intelligent customer service of the smart gas service platform 120 in a form of phone call to remind the gas user to arrange maintenance.

In some embodiments, the smoothness of the reliability in the reliability sequence may be calculated by weighting a sum of the reliability in the reliability sequence. For example, for the reliability sequence ($R_1$, $R_2$, $R_3$, $R_4$), the smoothness S of the reliability may be:

$$S = R_1 \times W_1 + R_2 \times W_2 + R_3 \times W_3 + R_4 \times W_4$$

where $R_1$, $R_2$, $R_3$, $R_4$ denote the reliability at a plurality of moments, and $W_1$, $W_2$, $W_3$, $W_4$ denote smoothness weights corresponding to $R_1$, $R_2$, $R_3$, $R_4$. In some embodiments, the smoothness weight of each reliability may be related to a confidence level of a degree of wear of a pipeline wall corresponding to the reliability. The higher the confidence level of a degree of wear of a pipeline wall of the reliability is, the greater the corresponding smoothness weight value may be. For further description regarding the confidence level of a degree of wear of a pipeline wall, please refer to FIG. 4.

In one or more embodiments of the present disclosure, by predicting a plurality of the future reliability, extending the predicted future reliability to the original reliability sequence, and calculating the smoothness based on the extended reliability sequence, an operation safety condition of the gas pipeline network may be obtained in advance through the obtained smoothness information, thereby effectively preventing a safety accident; and by correlating a smoothness calculation result with the confidence level of a degree of wear of a pipeline wall, accuracy of the smoothness calculation result may be further ensured.

In some embodiments, a monitoring plan may be determined based on the smoothness of the reliability. For example, when the smoothness is relatively poor, the smart gas safety management platform 130 may send an instruction for increasing collection accuracy or monitoring frequency to the smart gas object platform 150 through the smart gas pipeline network device sensor network platform 140, so as to further ensure the operation safety of the gas pipeline network.

In one or more embodiments of the present disclosure, by obtaining the reliability sequence of the gas pipeline network and determining the monitoring plan based on the reliability sequence, it is possible to keep abreast of changes of the reliability of the safe operation of the gas pipeline network over time, and find out potential safety hazards, focus on points where there may be safety hazards, and determine a more targeted monitoring plan, thereby effectively ensuring the safe operation of the gas pipeline network.

Figure 4:
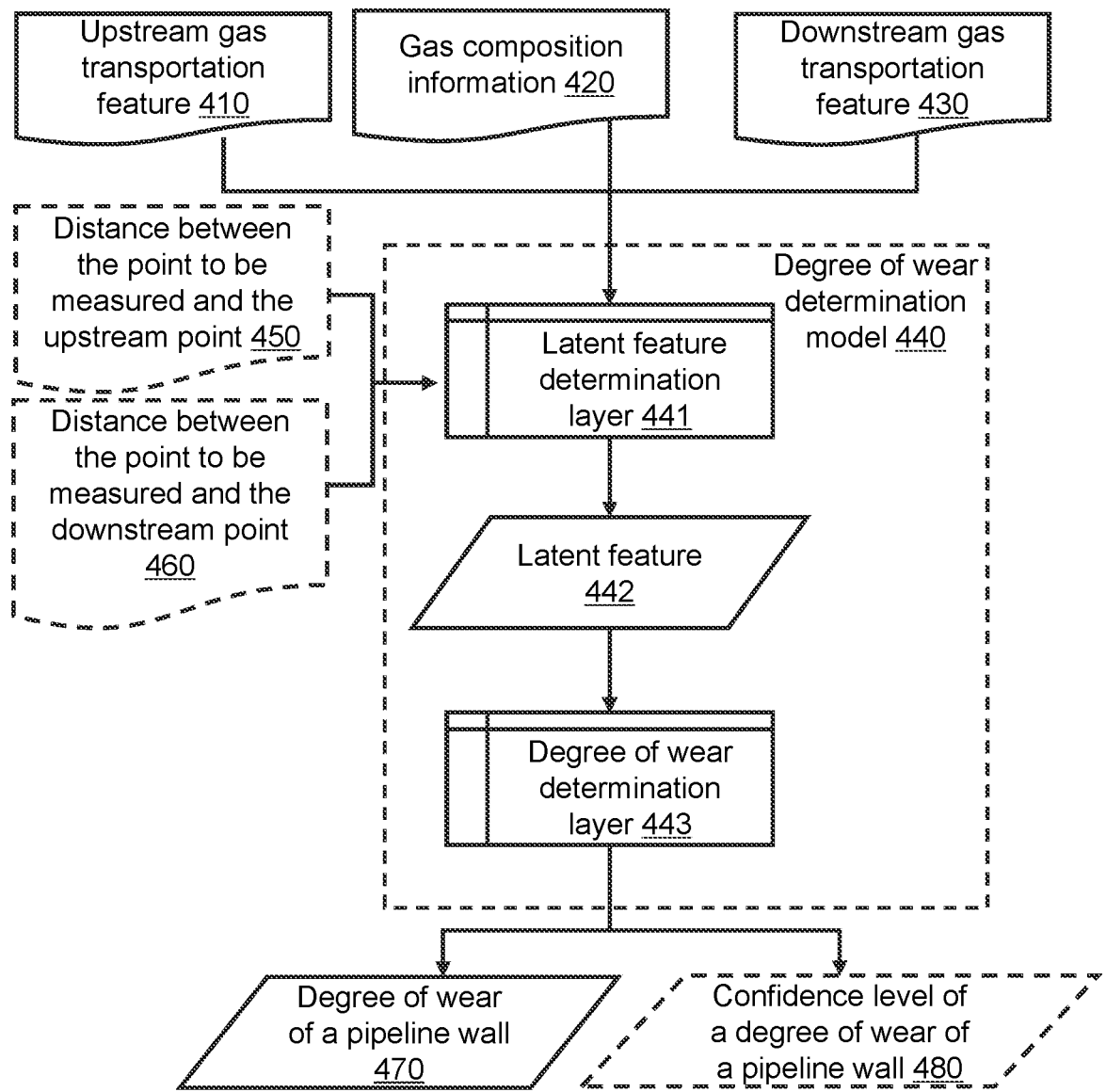
FIG. 4 is a schematic diagram illustrating a degree of wear determination model according to some embodiments of the present disclosure.

FIG. 4 is a schematic diagram illustrating a degree of wear determination model according to some embodiments of the present disclosure.

In some embodiments, a degree of wear determination model 440 may process a gas transportation feature of a device terminal of a smart gas object platform to determine a degree of wear of a pipeline wall 470 of a point to be measured. In some embodiments, the degree of wear determination model 440 may be a machine learning model.

In some embodiments, the gas pipeline network may include several points to be measured. In some embodiments, the gas transportation feature may include an upstream gas transportation feature 410 of an upstream point of the point to be measured, a downstream gas transportation feature 430 of a downstream point of the point to be measured, and gas composition information 420 of the point to be measured. For further description regarding the gas transportation feature, please refer to FIG. 2.

The point to be measured may refer to a point where the gas pipeline needs to be monitored. The point to be measured may be set based on manual experience or historical maintenance data. For example, a plurality of points to be measured may be set in an area with a high historical leakage frequency, or the plurality of points to be measured may be set in a densely populated area. A count of the points to be measured may be set according to an actual condition.

The upstream point and the downstream point may be respectively other points located at an upstream and a downstream of a current point to be measured during a gas transmission. Determination of the upstream and the downstream may be related to a direction of the gas transportation. For example, the upstream point may be a point on the gas pipeline that the gas passes through before the gas is transported to the current point to be measured, and the downstream point may be a point on the gas pipeline that the gas passes through after the gas is transported to the current point to be measured. Any point at the upstream of the current point to be measured may be selected as the upstream point, and any point at the downstream of the current point to be measured may be selected as the downstream point. Counts of upstream points and downstream points may be one or more than one.

In some embodiments, the degree of wear determination model 440 may be obtained through training. A first training sample may include an upstream gas transportation feature of a historical sample point, a downstream gas transportation feature of the historical sample point, and gas composition information of the historical sample point, and a first label of the first training sample may include a degree of wear of the pipeline wall of the sample point. A historical upstream gas transportation feature, a historical downstream gas transportation feature, and historical gas composition information of the first training sample may be input to the degree of wear determination model 440, a first loss function may be constructed based on the degree of wear of the pipeline wall output by the degree of wear determination model 440 and the first label, parameters of an initial degree of wear determination model may be iteratively updated based on the loss function until a first preset condition is satisfied, the parameters in the degree of wear determination model 440 may be determined, and a trained degree of wear determination model may be obtained. The first preset condition may include, but is not limited to, convergence of the first loss function, a training period reaching a threshold, etc.

As shown in FIG. 4, the degree of wear determination model 440 may include a latent feature determination layer 441 and a degree of wear determination layer 443.

The latent feature may include a depth information feature of the gas transportation, which may be indicated by a feature vector. A processing process of the hidden feature determination layer may be essentially a process of extracting the depth information. For example, the latent feature obtained through the latent feature determination layer may include a corresponding relation feature between the transportation pressure information of the gas pipeline network, the gas transmission flow rate information of the gas pipeline network device, the gas transmission temperature information of the gas pipeline network device, and the gas composition information and the degree of wear of the pipeline wall. The latent feature may further include a corresponding relation feature between the upstream gas transportation feature and the downstream gas transportation feature.

The latent feature determination layer 441 may process the upstream gas transportation feature 410 of the upstream point of the point to be measured, the downstream gas transportation feature 430 of the downstream point of the point to be measured, and the gas composition information 420 of the point to be measured to determine a latent feature 442. For example, an input of the latent feature determination layer 441 may include the upstream gas transportation feature (such as a gas transmission flow rate of 300 m$^3$/h, a moisture content of 20 mg/h, a solid particle content of 0.5 mg/m$^3$, a gas transportation pressure of 0.2 MPa), the downstream gas transportation feature (such as a gas transmission flow rate of 350 m$^3$/h, a moisture content of 20 mg/h, a solid particle content of 0.5 mg/m$^3$, a gas transportation pressure of 0.25 MPa), an output latent feature may be (e.g., 50, 0.05, 20, 0.5, 0.2), indicating a gas transmission flow rate difference between the upstream and the downstream of the point to be measured is 50 m$^3$/h, a gas transportation pressure difference between the upstream and the downstream is 0.05 MPa, and the corresponding degree of wear of the pipeline wall is 0.2 when the solid particle content is 0.5 mg/m$^3$ and the moisture content of the point to be measured is 20 mg/m$^3$.

A dimension of the latent feature may refer to a count of features contained in the feature vector corresponding to the latent feature. For example, if the latent feature contains 3 features, the latent feature may be a three-dimensional latent feature. The dimension of the latent feature may often affect a result of the model. For example, if the dimension of the latent feature is too small, the obtained latent feature may not fully represent the relationship between the real gas transportation feature and the degree of wear, and the degree of wear determination model may be difficult to converge. If the dimension of the latent feature is too great, a count of training samples required for training the degree of wear determination model may be greater, which may cause redundancy in the training process.

Therefore, the dimension of the latent feature may be manually preset, for example, according to a historical training result of the model, the dimension of the preset latent feature may contain 4 dimensions. In some embodiments, the latent feature may be dynamically adjusted based on a model training effect. In some embodiments, an initial dimension of the latent feature may be determined based on a count of model training samples. For example, when the count of the model training samples is small, the initial dimension of latent feature may be increased to obtain more model training samples; when the count of the model training samples is great, the initial dimension of the latent feature may be limited to avoid redundancy in the training process. The limitation on the latent feature dimension may be flexibly changed according to the count of the model samples, so as to avoid an adverse effect on the effect of model training caused by too great or too small latent feature dimension. Further description regarding the model training may be found below.

In one or more embodiments of the present disclosure, the dimension of the latent feature may be determined based on the count of model training samples, and the dimension of the latent feature may further be dynamically adjusted based on the model training effect, which can avoid a poor model training effect caused by an inappropriate latent feature dimension.

In some embodiments, the degree of wear determination layer 443 may be configured to determine the degree of wear of the pipeline wall 470 based on the latent feature 442. In some embodiments, the latent feature 442 output by the latent feature determination layer 441 may be taken as an input of the degree of wear determination layer 443. The degree of wear determination layer 443 may process the latent feature 442 and output the degree of wear of the pipeline wall 470. For example, the degree of wear determination layer 443 may process the three-dimensional latent feature, and output the degree of wear of the pipeline wall of 0.2.

The degree of wear determination model 440 may be obtained by training the latent feature determination layer 441 and the degree of wear determination layer 443. A second training sample may include the upstream gas transportation feature of the historical sample point, the downstream gas transportation feature of the historical sample point, and the gas composition information of the historical sample point, and a second label of the second training sample may include the degree of wear of the pipeline wall of the sample point. The historical upstream gas transportation feature, the historical downstream gas transportation feature, and the historical gas composition information of the second training sample may be input to the latent feature determination layer 441, and an output of the latent feature determination layer 441 may be input to the degree of wear determination layer 443, a second loss function may be determined based on the output of the degree of wear determination layer 443 and the second label, parameters of an initial latent feature determination layer and an initial degree of wear determination layer may be iteratively updated based on the second loss function until a second preset condition is satisfied, and the parameters in the latent feature determination layer 441 and the degree of wear determination layer 443 may be determined, and a trained degree of wear determination model may be to obtained. The second preset condition may include, but is not limited to, convergence of the second loss function, a training period reaching a threshold, etc.

In one or more embodiments of the present disclosure, based on the upstream gas transportation feature, the downstream gas transportation feature, and the gas composition information of the point to be measured, the degree of wear of the pipeline wall of the point to be measured may be determined through the degree of wear determination module, which may make the predicted degree of wear of the pipeline wall more accurate, so that problems such as corrosion, leakage, etc. may be found in the gas pipeline network in time, and a hidden danger of a safety accident may be reduced.

In some embodiments, the input of the degree of wear determination model may further include a distance 450 between the point to be measured and the upstream point, and a distance 460 between the point to be measured and the downstream point. For example, the degree of wear determination model 440 may process the upstream gas transportation feature (such as a gas transmission flow rate of 300 m$^3$/h, a moisture content of 20 mg/h, a solid particle content of 0.5 mg/m$^3$, a gas transportation pressure of 0.2 MPa), the downstream gas transportation feature (such as a gas transmission flow rate of 350 m$^3$/h, a moisture content of 20 mg/h, a solid particle content of 0.5 mg/m³, a gas transportation pressure of 0.25 MPa), and the distance between the point to be measured and the upstream point (such as 50 m), the distance between the point to be measured and the downstream point (such as 100 m), and output the degree of wear of the pipeline wall (such as 0.25).

In some embodiments, the second training sample may further include a distance between the point to be measured of a historical sample point and the upstream point, and a distance between the point to be measured of a historical sample point and the downstream point.

In some embodiments, the output of the degree of wear determination model 440 may further include a confidence level of a degree of wear of a pipeline wall 480.

The confidence level of the degree of wear is a degree of confidence of a predicted value of the degree of wear of the pipeline wall output by the degree of wear determination model. For example, the higher the consistency between the degree of wear of the pipeline wall output by the confidence level of the degree of wear and a pipeline wall sample label is, the higher the confidence level of the degree of wear may be.

In one or more embodiments of the present disclosure, when the degree of wear of the pipeline wall may be predicted through the degree of wear determination model, in addition to the gas transportation feature, the distance between the upstream point and the point to be measured and the distance between the downstream point and the point to be measured may be further considered, so that the degree of wear of the pipeline wall output by the degree of wear determination model may be closer to an actual condition. Through the confidence level of the degree of wear output by the degree of wear determination model, whether the degree of wear of the pipeline wall predicted by the degree of wear determination model is accurate may be determined, quality of the degree of wear determination model may be evaluated based on the confidence level of the degree of wear, and, according to an evaluation result, the predicted result of the degree of wear determination model may be closer to an actual value through continuous training, thereby achieving a more accurate model prediction.

In some embodiments, the downstream gas transportation feature 430 may be determined based on the upstream gas transportation feature 410 through a transportation feature prediction model. The transportation feature prediction model may be a machine learning model.

Figure 5:
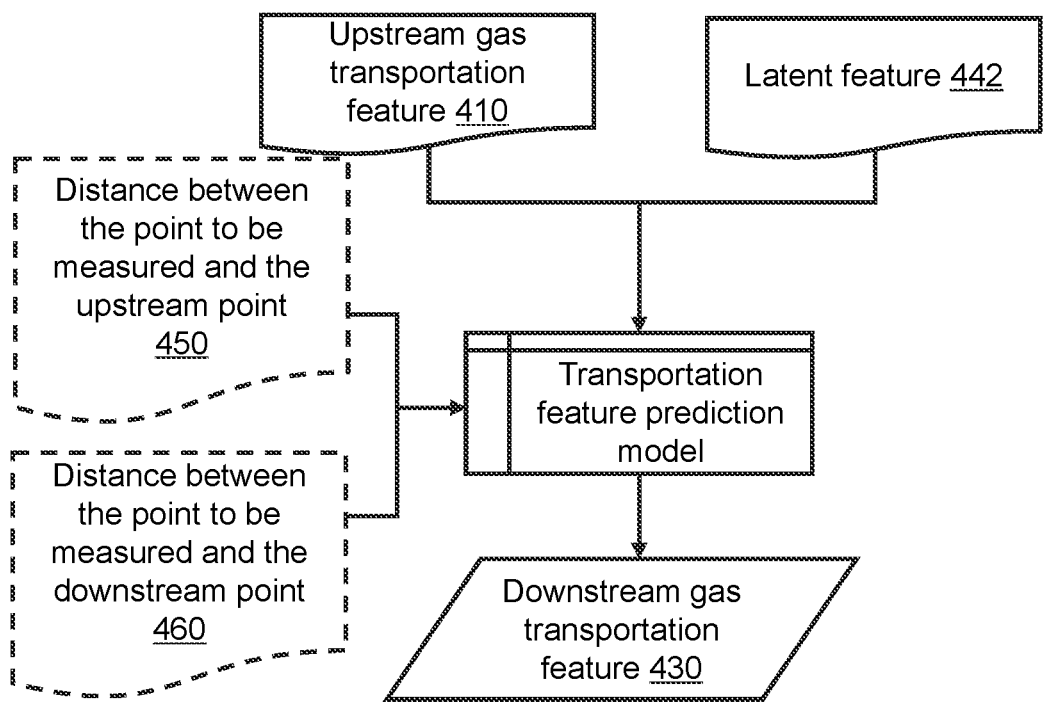
FIG. 5 is a schematic diagram illustrating a transportation feature prediction model according to some embodiments of the present disclosure.

FIG. 5 is a schematic diagram illustrating a transportation feature prediction model according to some embodiments of the present disclosure. In some embodiments, the transportation feature prediction model 500 may be configured to determine the downstream gas transportation feature 430 based on the latent feature 442 output by the latent feature determination layer 441 of the degree of wear determination model 440 and the upstream gas transportation feature 410. In some embodiments, the latent feature 442 output by the latent feature determination layer 441 and the upstream gas feature 410 may be taken as an input of the transportation feature prediction model 500. The transportation feature prediction model 500 may process the latent feature 442 and the upstream gas feature 410, and output the downstream gas transportation feature 430. For example, the transportation feature prediction model 500 may process the upstream gas transportation feature (such as a gas transmission flow rate 300 of m³/h, a moisture content 20 of mg/m³, a solid particle content 0.5 of mg/m³, a gas transportation pressure of 0.2 MPa) and the latent feature 442, and output the upstream gas transportation feature (such as a gas transmission flow rate of 350 m³/h, a moisture content of 20 mg/m³, a solid particle content of 0.5 mg/m³, a gas transportation pressure of 0.25 MPa).

In some embodiments, the transportation feature prediction model 500 may be obtained through training. A third training sample may include an upstream gas transportation feature of a historical sample point and a latent feature of the historical sample point. The latent feature of the historical sample point may be obtained based on the output of the latent feature determination layer of the degree of wear determination model. A third label of the third training sample may include an actual downstream gas transportation feature. The historical upstream gas transportation feature and the historical latent feature of the third training sample may be input to the transportation feature prediction model 500, a third loss function may be constructed based on the downstream gas transportation feature output by the transportation feature prediction model 500 and a third label, parameters of an initial transportation feature prediction model may be iteratively updated based on the third loss function until a third preset condition is satisfied, the parameters in the transportation feature prediction model 500 may be determined, and a trained transportation feature prediction model may be obtained. The third preset condition may include, but is not limited to, convergence of the third loss function, a training period reaching a threshold, etc.

In some embodiments, the degree of wear determination model 440 may be obtained based on joint training with the transportation feature prediction model 500. A fourth training sample may include the upstream gas transportation feature of the historical sample point, an downstream gas transportation feature of the historical sample point, gas composition information of the historical sample point, and the latent feature of the historical sample point. A fourth label of the fourth training sample may include the degree of wear of the pipeline wall and an actual value of the downstream gas feature.

In some embodiments, the degree of wear of the pipeline wall output by the degree of wear determination model may be directly taken as a fourth training label of the fourth training sample.

During the joint training, the historical upstream gas transportation feature, the historical downstream gas transportation feature, and the historical gas composition information of the fourth training sample may be input to the latent feature determination layer 441 of the degree of wear determination model 440, and the output of the latent feature determination layer 441 may be input to the degree of wear determination layer 443. Based on the output of the degree of wear determination layer 443 and the degree of wear of the pipeline wall in the fourth label, a first loss item of the fourth loss function may be constructed. The historical upstream gas transportation feature and the historical latent feature may be input to the transportation feature prediction model 500. A second loss item of the fourth loss function may be constructed based on the downstream gas transportation feature output by the transportation feature prediction model 500 and the actual value of the downstream gas feature in the fourth label. Parameters of an initial latent feature determination layer, an initial degree of wear determination layer, and an initial transportation feature prediction model may be iteratively updated based on the fourth loss function until a fourth preset condition is satisfied. The parameters of the latent feature determination layer 441, the degree of wear determination layer 443, and the transportation feature prediction model 500 may be determined, and a trained degree of wear determination model and a trained transportation feature prediction model may be obtained. The fourth preset condition may include, but is not limited to, convergence of the fourth loss function, a training period reaching a threshold, etc.

In some embodiments, when smoothness of the reliability in a short term period of time is relatively low, it may indicate that the training effect is relatively poor, so that the degree of wear of the pipeline wall output by the degree of wear determination model may be affected, and the confidence level of the degree of wear of the pipeline wall may be not high. At this time, weights of the first loss item and the second loss item of the fourth loss function may be adjusted. For example, the weight of the loss item corresponding to the gas transportation feature may be increased. A weight adjustment mode of the first loss item or the second loss item may be preset based on a historical training result. In some embodiments, a weight adjustment range may be related to the smoothness of the reliability. For example, the lower the smoothness of the reliability is, the greater the adjustment range may be. Exemplarily, the fourth loss function is:

$$LOSS = l_1 \times W_a + l_2 \times W_b$$

where $i_1$, $i_2$ denote error loss of the first loss item and the second loss item respectively. $W_a$, $W_b$ denote reference weights. Accordingly, when the smoothness of the reliability determined according to the predicted degree of wear of the pipeline wall decreases in a short period of time (e.g., within 1 hour) by more than a smoothness error threshold (e.g., 10%), the reference weight Wp of the second loss item may be increased according to historical training experience. For example, every time the decrease of the smoothness of the reliability exceeds the smoothness error threshold by 10%, the reference weigh $W_b$ of the second loss item may be increased by 10%.

In one or more embodiments of the present disclosure, the degree of wear determination model may be obtained through the joint training where the transportation feature prediction model is added, which can effectively improve the training, and make the predicted result more accurate. An abnormality of the smoothness caused by the poor model training may be corrected by adjusting the first loss item and the second loss item, which can reduce misjudgment of the abnormality of the smoothness.

In some embodiments, the input of the transportation feature prediction model 500 and the latent feature determination layer 441 may further include the distance 450 between the point to be measured and the upstream point, and the distance 460 between the point to be measured and the downstream point. The above distances may be determined according to an actual scale by referring to a pipeline network laying diagram of the pipeline network simulation module of the smart gas pipeline network safety management sub-platform. For example, the transportation feature prediction model 500 may process the upstream gas transportation pressure of 0.2 MPa, the latent feature 442, the distance between the point to be measured and the upstream point of 50 m, and the distance between the point to be measured and the downstream point of 100 m, and output the downstream gas transportation pressure of 0.25 MPa. In some embodiments, the fourth training sample may further include a distance between the historical sample point to be measured and the upstream point, and a distance between the historical sample point to be measured and the downstream point.

In one or more embodiments of the present disclosure, the distance between the point to be measured and the upstream point and the distance between the point to be measured and the downstream point may be further considered when the latent feature and the downstream gas transportation feature are determined, so that the information corresponding to the latent feature and the downstream gas transportation feature may be more real and comprehensive, which can make the model prediction result more accurate and reliable.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for monitoring reliability of a smart gas pipeline network implemented based on a smart gas safety management platform of an Internet of Things (IoT) system for monitoring reliability of a smart gas pipeline network, comprising:

obtaining a reliability sequence of the gas pipeline network, the reliability sequence including reliability of the gas pipeline network at a plurality of moments; and determining a monitoring plan based on the reliability sequence to control monitoring devices in a smart gas device object platform to obtain operation information of gas devices in the gas pipeline network in accordance with the monitoring plan, wherein the monitoring devices include at least one of a gas flow meter, a pressure sensor, and a temperature sensor, wherein determining the reliability of the gas pipeline network at each of the plurality of moments comprises:

obtaining a gas transportation feature of the gas pipeline network at a target moment through the gas flow meter the pressure sensor and the temperature sensor in the smart gas device object platform;

determining, based on the gas transportation feature, a degree of wear of a pipeline wall of a point to be measured through a degree of wear determination model, wherein the degree of wear determination model is a machine learning model, the gas pipeline network includes several points to be measured, and the gas transportation feature includes an upstream gas transportation feature of an upstream point of the point to be measured, a downstream gas transportation feature of a downstream point of the point to be measured, and gas composition information of the point to be measured, the degree of wear determination model includes a latent feature determination layer and a degree of wear determination layer, and the degree of wear determination model is obtained based on joint training with a transportation feature prediction model, wherein the transportation feature prediction model is configured to determine, based on the upstream gas transportation feature and the latent feature, the downstream gas transportation feature, and the transportation feature prediction model is a machine learning model, the latent feature includes a corresponding relation feature between transportation pressure information of the gas pipeline network, gas transmission flow rate information of a gas pipeline network device, gas transmission temperature information of the gas pipeline network device, and the gas composition information and the degree of wear of the pipeline wall of the point to be measured;

determining, based on the degree of wear of the pipeline wall of the point to be measured, the reliability of the gas pipeline network at the target moment; and in response to determining that the reliability of the gas pipeline network is lower than a threshold, displaying warning information to a user through a terminal device.

2. The method of claim 1, wherein the IoT system for monitoring reliability of a smart gas pipeline network further includes: a smart gas user platform, a smart gas service platform, a smart gas pipeline network device sensor network platform, and a smart gas pipeline network device object platform;

the smart gas pipeline network device object platform is configured to obtain the gas transportation feature of the gas pipeline network at the target moment; and transmit the gas transportation feature to the smart gas safety management platform through the smart gas pipeline network device sensor network platform; and the method further comprises:

the smart gas service platform sending the monitoring plan received from the smart gas safety management platform to the smart gas user platform.

3. The method of claim 2, wherein in the IoT system for monitoring reliability of a smart gas pipeline network, the smart gas user platform includes a gas user sub-platform and a supervision user sub-platform;

the smart gas service platform includes a smart gas use service sub-platform corresponding to the gas user sub-platform, and a smart supervision service sub-platform corresponding to the supervision user sub-platform; and the smart gas safety management platform includes a smart gas pipeline network safety management sub-platform and a smart gas data center; wherein the smart gas pipeline network safety management sub-platform includes a pipeline network device safety monitoring module, a safety emergency management module, a pipeline network risk assessment management module, and a pipeline network geographic information management module.

4. The method of claim 1, wherein an input of the degree of wear determination model further includes: a distance between the point to be measured and the upstream point, and a distance between the point to be measured and the downstream point.

5. The method of claim 1, wherein an output of the degree of wear determination model further includes: a confidence level of the degree of wear of the pipeline wall of the point to be measured.

6. The method of claim 1, wherein an input of the transportation feature prediction model and the latent feature determination layer further includes: a distance between the point to be measured and the upstream point, and a distance between the point to be measured and the downstream point.

7. The method of claim 1, wherein the determining a monitoring plan based on the reliability sequence comprises:
   determining, based on the reliability sequence, smoothness of the reliability; and
   determining, based on the smoothness of the reliability, the monitoring plan.

8. The method of claim 7, wherein the determining, based on the reliability sequence, smoothness of the reliability comprises:
   predicting, based on the reliability sequence, future reliability at at least one future moment;
   extending the future reliability at the at least one future moment to the reliability sequence to obtain a new reliability sequence; and
   determining, based on the new reliability sequence, the smoothness of the reliability.

9. An Internet of Things (IoT) system for monitoring reliability of a gas pipeline network comprising: a smart gas user platform, a smart gas service platform, a smart gas safety management platform, a smart gas pipeline network device sensor network platform, and a smart gas pipeline network device object platform, wherein
   the smart gas pipeline network device object platform is configured to obtain a gas transportation feature of the gas pipeline network at a target moment; and transmit the gas transportation feature to the smart gas safety management platform through the smart gas pipeline network device sensor network platform, and the smart gas pipeline network device object platform is further configured as various types of gas devices and monitoring devices;
   the smart gas service platform is configured to send a monitoring plan received from the smart gas safety management platform to the smart gas user platform, the smart gas service platform includes a first processing device, the smart gas user platform is configured as a terminal device; and
   the smart gas safety management platform which includes a second processing device, is configured to:
   obtain a reliability sequence of the gas pipeline network, the reliability sequence including reliability of the gas pipeline network at a plurality of moments; and
   determine the monitoring plan based on the reliability sequence to control monitoring devices in a smart gas device object platform to obtain operation information of gas devices in the gas pipeline network in accordance with the monitoring plan, wherein the monitoring devices include at least one of a gas flow meter, a pressure sensor, and a temperature sensor, wherein determining the reliability of the gas pipeline network at each of the plurality of moments includes:
   obtaining a gas transportation feature of the gas pipeline network at a target moment through the gas flow meter, the pressure sensor and the temperature sensor in the smart gas device object platform;
   determining, based on the gas transportation feature, a degree of wear of a pipeline wall of a point to be measured through a degree of wear determination model, wherein the degree of wear determination model is a machine learning model, the gas pipeline network includes several points to be measured, and the gas transportation feature includes an upstream gas transportation feature of an upstream point of the point to be measured, a downstream gas transportation feature of a downstream point of the point to be measured, and gas composition information of the point to be measured, the degree of wear determination model includes a latent feature determination layer and a degree of wear determination layer, and the degree of wear determination model is obtained based on joint training with a transportation feature prediction model, wherein the transportation feature prediction model is configured to determine, based on the upstream gas transportation feature and the latent feature, the downstream gas transportation feature, and the transportation feature prediction model is a machine learning model, the latent feature includes a corresponding relation feature between transportation pressure information of the gas pipeline network, gas transmission flow rate information of a gas pipeline network device, gas transmission temperature information of the gas pipeline network device, and the gas composition information and the degree of wear of the pipeline wall of the point to be measured;
   determining, based on the degree of wear of the pipeline wall of the point to be measured, the reliability of the gas pipeline network at the target moment; and
   in response to determining that the reliability of the gas pipeline network is lower than a threshold, displaying warning information to a user through the terminal device.

10. The IoT system of claim 9, wherein the smart gas user platform includes a gas user sub-platform and a supervision user sub-platform;
   the smart gas service platform includes a smart gas use service sub-platform corresponding to the gas user sub-platform, and a smart supervision service sub-platform corresponding to the supervision user sub-platform; and
   the smart gas safety management platform includes a smart gas pipeline network safety management sub-platform and a smart gas data center; wherein the smart gas pipeline network safety management sub-platform includes a pipeline network device safety monitoring module, a safety emergency management module, a pipeline network risk assessment management module, and a pipeline network geographic information management module.

11. The IoT system of claim 9, wherein an input of the degree of wear determination model further includes: a distance between the point to be measured and the upstream point, and a distance between the point to be measured and the downstream point.

12. The IoT system of claim 9, wherein an output of the degree of wear determination model further includes: a confidence level of the degree of wear of the pipeline wall of the point to be measured.

13. The IoT system of claim 9, wherein an input of the transportation feature prediction model and the latent feature determination layer further includes: a distance between the point to be measured and the upstream point, and a distance between the point to be measured and the downstream point.

14. The IoT system of claim 9, wherein the smart gas safety management platform is further configured to:
   determine, based on the reliability sequence, smoothness of the reliability; and
   determine, based on the smoothness of the reliability, the monitoring plan.

15. The IoT system of claim 14, wherein the determining, based on the reliability sequence, smoothness of the reliability comprises:
predicting, based on the reliability sequence, future reliability at at least one future moment;
extending the future reliability at the at least one future moment to the reliability sequence to obtain a new reliability sequence; and
determining, based on the new reliability sequence, the smoothness of the reliability.

16. A non-transitory computer-readable storage medium storing computer instructions, wherein when reading the computer instructions in the storage medium, a computer implements the method of claim 1.

17. The method of claim 1, wherein a training sample for the joint training includes a historical upstream gas transportation feature of a historical sample point, a historical downstream gas transportation feature of the historical sample point, historical gas composition information of the historical sample point, and a historical latent feature of the historical sample point; a label of the training sample includes a historical degree of wear of the pipeline wall and an actual value of the historical downstream gas transportation feature;
during the joint training, the historical upstream gas transportation feature, the historical downstream gas transportation feature, and the historical gas composition information of the training sample are input to the latent feature determination layer of the degree of wear determination model, and the output of the latent feature determination layer is input to the degree of wear determination layer; based on the output of the degree of wear determination layer and the degree of wear of the pipeline wall in the label, a first loss item of a loss function is constructed;
the historical upstream gas transportation feature and the historical latent feature are input to the transportation feature prediction model, a second loss item of the loss function is constructed based on the downstream gas transportation feature output by the transportation feature prediction model and the actual value of the historical downstream gas transportation feature in the label;
parameters of an initial latent feature determination layer, an initial degree of wear determination layer, and an initial transportation feature prediction model are iteratively updated based on the loss function until a preset condition is satisfied, the parameters of the latent feature determination layer, the degree of wear determination layer, and the transportation feature prediction model are determined, and a trained degree of wear determination model and a trained transportation feature prediction model are obtained.

18. The method of claim 17, wherein weights of the first loss item and the second loss item of the loss function are adjusted based on smoothness of the reliability, and the lower the smoothness of the reliability is, the greater a adjustment range is.

19. The method of claim 1, wherein a dimension of the latent feature is preset and dynamically adjusted based on a model training effect, an initial dimension of the latent feature is determined based on a count of model training samples, and the dimension of the latent feature refers to a count of features contained in a feature vector corresponding to the latent feature.

20. The method of claim 9, wherein the smoothness of the reliability in the reliability sequence is calculated by weighting a sum of the reliability in the reliability sequence, a smoothness weight of each reliability is related to a confidence level of the degree of wear of the pipeline wall corresponding to the reliability, and the higher the confidence level of the degree of wear of the pipeline wall of the reliability is, the greater a corresponding smoothness weight value is.

* * * * *